UNITED STATES PATENT OFFICE.

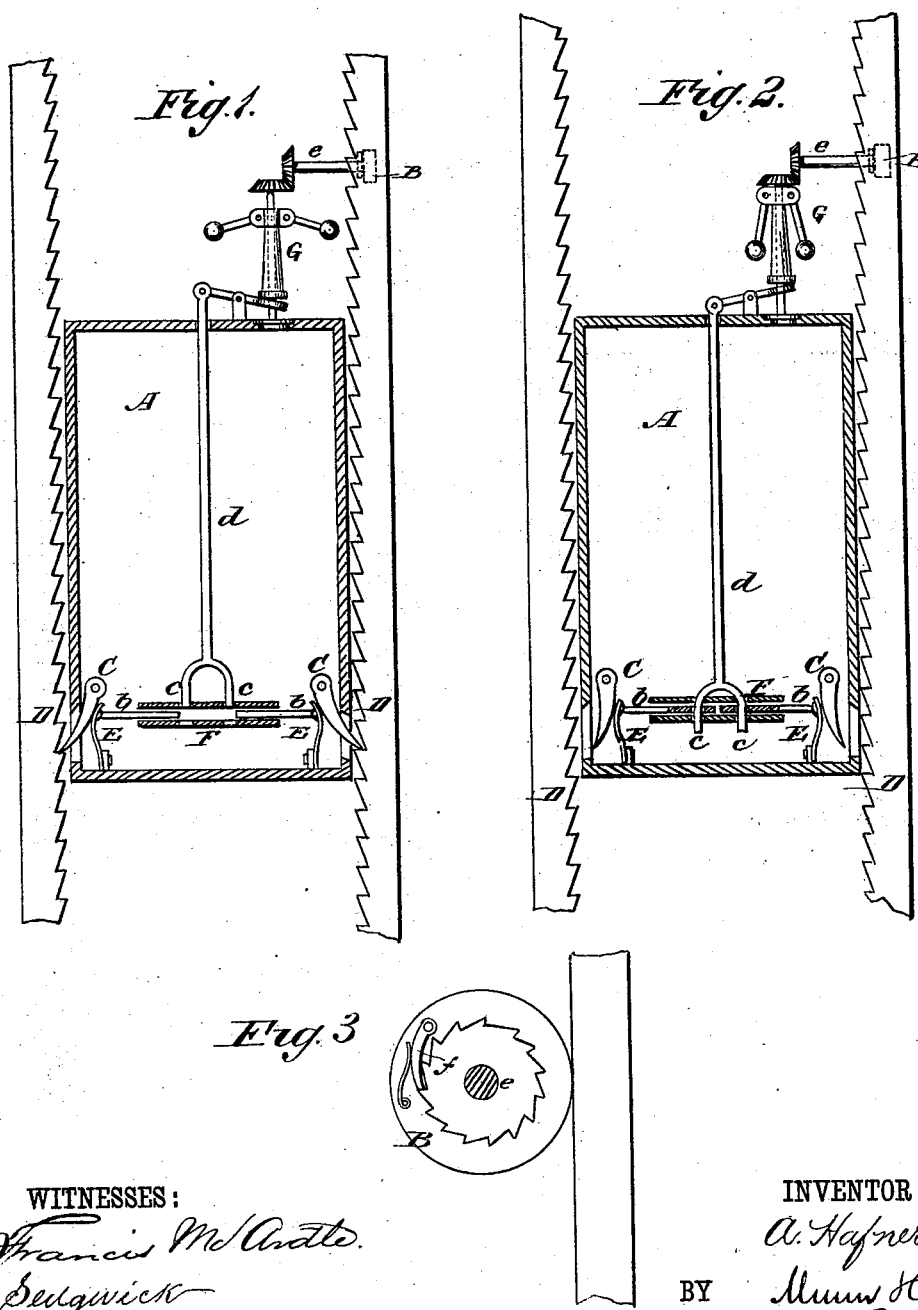

ADAM HAFNER, OF EATONTON, GEORGIA.

GOVERNOR ATTACHMENT FOR ELEVATORS.

SPECIFICATION forming part of Letters Patent No. 253,695, dated February 14, 1882.

Application filed December 27, 1881. (No model.)

*To all whom it may concern:*

Be it known that I, ADAM HAFNER, of Eatonton, in the county of Putnam and State of Georgia, have invented certain new and useful Improvements in Governor Attachments to Elevators, of which the following is a full, clear, and exact description.

In the accompanying drawings, which form part of this specification, similar letters of reference indicate corresponding parts in all the figures.

The invention consists in a combination, with the car or cage of an elevator, of a centrifugal governor operated by the motion of the cage, as hereinafter described, and spring-locking devices controlled by said governor, whereby in case of the too rapid descent of the cage, as produced by the breakage of the lifting-rope or from any other cause, the springs of the locking devices are liberated by the action of the governor, to automatically arrest and hold the cage, and so avoid injury or accident.

The invention also consists in the combination, with said governor, of means for restricting its action to the descending movement of the cage, whereby all unnecessary strain and wear during the upward movement of the cage are avoided.

Figure 1 represents a sectional elevation of an elevator-cage having my invention applied, and showing the cage as automatically arrested in its descent by the action of the governor. Fig. 2 is a similar view, but showing the cage as not arrested in its descent, but free to move up or down. Fig. 3 is a view upon a larger scale of the primary driving-wheel of the governor in connection with means for restricting its action to the descending movement of the cage.

A is the car or cage, on which is mounted a Judson or any other suitable centrifugal governor, G. Motion is imparted to said governor by a primary driving-wheel, B, which may either be a toothed wheel pitched to gear with a rack extending throughout the length of the shaft in which the cage moves or may be a plain wheel actuated by friction contact with a plain fixed surface in the shaft.

The cage A is provided with two or more pawls or stops, C C, on opposite sides of it, which ordinarily hang clear of a corresponding number of notched or toothed uprights D D in the shaft, as shown in Fig. 2, but which, when thrown into action, engage with said uprights to arrest the cage in its descent, as shown in Fig. 1. These pawls are thrown into action and held in contact with the toothed uprights D D by springs E E when liberated for the purpose. Ordinarily said springs are held back from thus operating on the pawls by means of rods $b\ b$, which enter a locking-case, F, and are held in lock by pins $c\ c$, which pass through apertures in said case and in the rods $b\ b$, as shown in Fig. 2. These pins $c\ c$ may be formed by forked projections at the lower end of an upright rod, $d$, which is raised by the action of the governor G. When the cage moves too rapidly downward the action of the governor is quickened by the accelerated motion of the primary driver B, and the rod $d$ is raised, thus liberating the rods $b\ b$ and their attached springs E E, which then act upon the pawls C C and hold the latter in locking contact with the uprights D D, as shown in Fig. 1.

Of course these spring-locking devices, or devices for holding and liberating the springs which act upon the pawls subject to the control of the governor, as described, may be variously constructed; but it is necessary that the springs should be released by the governor to throw and hold the pawls in locking contact with the uprights D D whenever the speed of the cage in its descent is dangerously rapid.

To avoid undue strain and wear on the governor or its gearing when the cage is ascending, said governor has only motion imparted to it during the descending movement of the cage, and is at rest when the cage is ascending. This may be done automatically by arranging the primary driver B loose on its shaft $e$ and coupling the latter with it by a clutch or pawl and ratchet-connection, $f$, arranged so that when the driver B moves in the direction which the cage gives it in descending it will be in driving-connection with the shaft $e$, that transmits motion to the governor; but when said driver B moves in the reverse direction during the ascent of the cage it is liberated from driving-connection with said shaft.

Having thus described my invention, what

I claim as new, and desire to secure by Letters Patent, is—

1. The combination, with the loosely-suspended pawls C C, of the springs E, the slide-rods $d\ d$, attached to the upper ends of said springs, the case F, to receive the sliding rods, and the pins $c$, passing through said case and rods to hold the springs back and allow the pawls to drop out of the ratchets, as shown and described.

2. The combination, with the pins which lock the spring-holding rods to the case, of the rod $d$, extending up through the cage and connecting by a lever with the described governor mechanism, as and for the purpose specified.

ADAM HAFNER.

Witnesses:
R. B. NISBET,
J. Q. ADAMS.